(12) United States Patent
Onishi et al.

(10) Patent No.: US 6,669,742 B2
(45) Date of Patent: Dec. 30, 2003

(54) METHOD FOR PRODUCING A NICKEL METAL-HYDRIDE STORAGE BATTERY

(75) Inventors: Masato Onishi, Toyohashi (JP); Katsuyuki Tomioka, Toyohashi (JP); Noriyuki Fujioka, Kosai (JP); Munehisa Ikoma, Shiki (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 130 days.

(21) Appl. No.: 10/090,901

(22) Filed: Mar. 4, 2002

(65) Prior Publication Data

US 2002/0138971 A1 Oct. 3, 2002

(30) Foreign Application Priority Data

Mar. 5, 2001 (JP) ........................................ 2001-060306

(51) Int. Cl.$^7$ .............................. H01M 6/00; H02J 7/00
(52) U.S. Cl. ...................... 29/623.1; 429/223; 320/130; 320/138
(58) Field of Search ................................ 29/623.1, 730; 429/120, 223, 218.2; 320/128, 130, 138

(56) References Cited

U.S. PATENT DOCUMENTS

| | | | | |
|---|---|---|---|---|
| 5,708,349 A | * | 1/1998 | Hasebe et al. | 429/206 |
| 5,965,295 A | * | 10/1999 | Bando et al. | 429/223 |
| 6,258,483 B1 | * | 7/2001 | Abe | 429/223 |
| 2003/0017395 A1 | * | 1/2003 | Miki et al. | 429/223 |

FOREIGN PATENT DOCUMENTS

| | | |
|---|---|---|
| JP | 58-14473 | 1/1983 |
| JP | 1-267966 | 10/1989 |

\* cited by examiner

*Primary Examiner*—Patrick Ryan
*Assistant Examiner*—Raymond Alejandro
(74) *Attorney, Agent, or Firm*—Merchant & Gould P.C.

(57) ABSTRACT

A method for producing a nickel metal-hydride storage battery includes: (i) assembling a battery by enclosing the positive electrodes, the negative electrodes, separators, and an electrolyte in a case; (ii) charging the battery with electric current in a range of 0.05 C (ampere) to 0.2 C (ampere) until a state of charge rises to a range of 10% to 30%; (iii) overcharging the battery that has been subjected to the charging, with electric current in a range of 0.2 C (ampere) to 1 C (ampere), and thereafter discharging the same until the state of charge lowers to 10% or below; and (iv) subjecting the battery after overcharging to a plurality of charging-discharging cycles, each charging-discharging cycle being composed of charging the battery that has been subjected to the overcharging, with electric current in a range of 0.2 C (ampere) to 5 C (ampere) until the state of charge rises to a range of 60% to 95%, and discharging the same until a battery voltage lowers to a range of 0.70 V to 1.05 V. In this method, in the charging-discharging cycles, the battery is cooled with a coolant at a temperature in a range of 30° C. to 60° C. This method makes it possible to produce a nickel metal-hydride storage battery at high productivity and low cost.

5 Claims, 5 Drawing Sheets

METHOD FOR PRODUCING A NICKEL METAL-HYDRIDE STORAGE BATTERY

BACKGROUND OF THE INVENTION

1. Field of the Invention

The present invention relates to a method for producing a nickel metal-hydride storage battery employing a hydrogen-absorbing alloy.

2. Related Background Art

Recently, alkaline storage batteries have been drawing attention as power sources for portable equipment and as power sources for electric cars or hybrid electric vehicles, and are required to have higher performance than ever. Nickel metal-hydride storage batteries, in particular, are secondary batteries that have positive electrodes including an active material containing nickel hydroxide as a principal component and negative electrodes including a hydrogen-absorbing alloy as a principal material. Therefore, they have rapidly spread as secondary batteries having high energy densities and high reliability.

In such a nickel metal-hydride secondary battery, the hydrogen-absorbing alloy has low activity immediately after the battery is assembled. Therefore, there is a problem that the battery power at the initial stage is low. To solve this problem, techniques of activating the hydrogen-absorbing alloy after assembling a battery have been proposed.

For instance, a method of leaving (aging) a battery after assembling for half a day to five days in a state in which a hydrogen-absorbing alloy has absorbed hydrogen has been disclosed (see JP 1(1989)-267966A)

However, the foregoing conventional method has involved a problem that it is difficult to improve the productivity, since the aging requires a long period of time.

SUMMARY OF THE INVENTION

Therefore, with the foregoing in mind, it is an object of the present invention to provide a method for producing a nickel metal-hydride storage battery that allows nickel metal-hydride storage battery to be produced with high productivity at low costs.

To achieve the foregoing object, a method for producing a nickel metal-hydride storage battery according to the present invention is a method for producing a nickel metal-hydride storage battery that includes positive electrodes containing nickel hydroxide and negative electrodes containing a hydrogen-absorbing alloy, and has a nominal capacity of C (ampere-hour). The method includes: (i) assembling a battery by enclosing the positive electrodes, the negative electrodes, separators, and an electrolyte in a case; (ii) charging the battery with electric current in a range of 0.05 C (ampere) to 0.2 C (ampere) until a state of charge (hereinafter also referred to as "SOC") rises to a range of 10% to 30%; (iii) overcharging the battery that has been subjected to the charging, with electric current in a range of 0.2 C (ampere) to 1 C (ampere), and thereafter discharging the same until the state of charge lowers to 10% or below; and (iv) subjecting the battery after the discharging to a plurality of charging-discharging cycles. Each charging-discharging cycle is composed of charging the battery with electric current in a range of 0.2 C (ampere) to 5 C (ampere) until the state of charge rises to a range of 60% to 95%, and discharging the same until a battery voltage lowers to a range of 0.70 V to 1.05 V. In this method, in the charging-discharging cycles, the battery is cooled with a coolant at a temperature in a range of 30° C. to 60° C. It should be noted that the "state of charge" is an index indicative of a charged state, and means an amount of a charge relative to a nominal capacity. The foregoing producing method allows batteries to be activated without aging, thereby making it possible to produce nickel metal-hydride storage battery at high productivity and low costs. The nominal capacity is determined in the following manner. First of all, a battery is charged to 120% of a presumed capacity thereof in an atmosphere at 25° C., and thereafter, it is left to stand for 30 minutes. Then, the battery is discharged in an atmosphere at 25° C. until the battery has a battery voltage of 1.0 V. The charging and discharging process is carried out with an amperage of one third of the presumed capacity (C/3). This charging and discharging process is repeated twice, and the discharge capacity at the second time is referred to as the nominal capacity.

In the foregoing method, the charging-discharging cycle preferably is carried out 5 times to 60 times. This configuration ensures production of a nickel metal-hydride storage battery that is activated sufficiently.

In the foregoing method, in the charging-discharging cycles, the battery preferably is cooled with a coolant at a temperature in a range of 30° C. to 45° C. This configuration allows a case made of a resin to be employed.

In the foregoing method, the coolant preferably is water. Water is easy to control in the foregoing temperature range of the coolant, and it is inexpensive as a coolant.

In the foregoing method, in the charging-discharging cycles, the battery preferably is cooled using a cooling frame. This configuration facilitates the cooling of the battery.

DETAILED DESCRIPTION OF THE INVENTION

Figure 1:
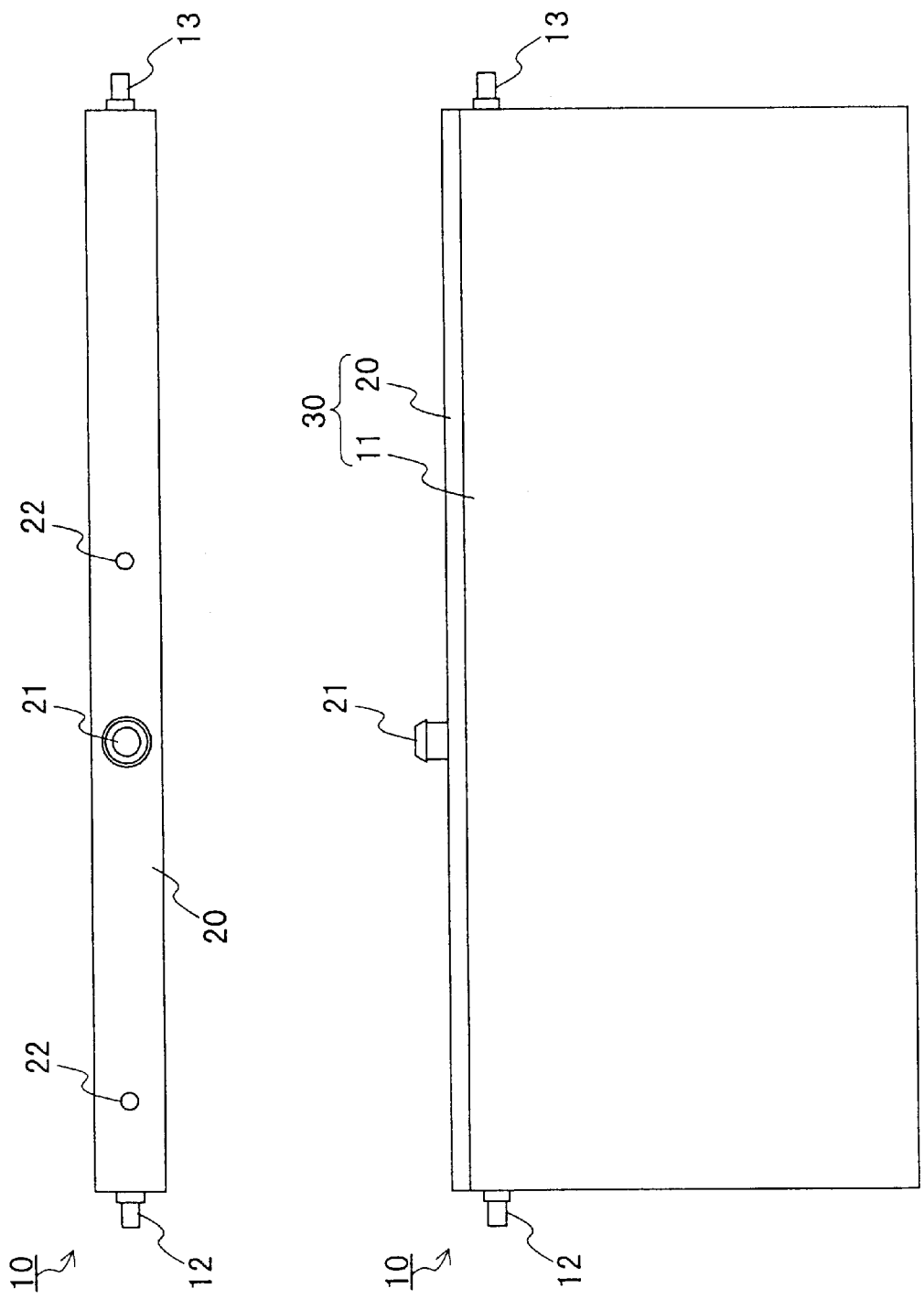
FIGS. 1A and 1B are a top view and a side view, respectively, which illustrate an example of a nickel metal-hydride storage battery produced by the method according to the present invention.

Hereinafter, the present invention will be described by way of illustrative embodiments. It should be noted that the embodiment and example shown below merely illustrate one example, and the present invention is not limited to the embodiment and example shown below.

In a method according to the present invention for producing a nickel metal-hydride storage battery, first of all, positive electrodes, negative electrodes, separators, and an electrolyte are sealed in a case to assemble a battery (first operation). In the first operation, those components conventionally employed in a nickel metal-hydride storage battery can be employed for the positive electrodes, the negative electrodes, the separators, the electrolyte, and the case. More specifically, as the positive electrodes, nickel foam filled with an active material containing nickel hydroxide as a principal component may be used. As the negative electrodes, for instance, negative electrodes including a hydrogen-absorbing alloy containing Mm (misch metal), nickel, aluminum, cobalt, and manganese may be used. As the separators, for instance, a sulfonated polypropylene separator may be used. As the electrolyte, an alkaline aqueous solution containing potassium hydroxide as a principal component may be used. It should be noted that the same applies to a module battery in which a plurality of unit cells are combined.

Then, the battery is charged with electric current in a range of 0.05·C(A) to 0.·C(A) until the SOC rises to a range of 10% to 30% (second operation). Here, the nominal capacity of a battery to be produced is C(Ah), and 1·C(A) is equivalent to a current value of one hour rate (1C).

Thereafter, the battery that has been subjected to the second operation is overcharged with current in a range of 0.2·C(A) to 1·C(A), and then it is discharged until the SOC lowers to 10% or below (preferably, 5% to 0%) (third operation). The overcharging preferably is carried out until the SOC rises to a range of 100% to 130%. Furthermore, the discharging in the third operation preferably is carried out while the battery is being cooled with a coolant at a temperature in a range of 30° C. to 45° C.

Thereafter, the battery that has been subjected to the third operation is charged with current in a range of 0.2·C(A) to 5·C(A) (preferably, 1·C(A) to 4·C(A)) until the SOC rises to a range of 60% to 95% (preferably, 80% to 90%), and then, it is discharged until the battery voltage lowers to a range of 0.70 V to 1.05 V (preferably, 0.90 V to 1.00 V). This charging-discharging cycle is repeated a plurality of times (preferably, in a range of 5 to 60 times) (fourth operation). In the discharging of the battery in the fourth operation, the battery is cooled with a coolant at 30° C. to 60° C. Here, it particularly preferably is cooled with a coolant at 30° C. to 45° C.

As the coolant, various types of coolants can be used, for instance, water, ethylene glycol, silicon oil, etc. It should be noted that a frame for cooling preferably is used when cooling the battery with a coolant. The cooling frame preferably is made of a material having a high heat conductivity, such as aluminum.

Thus, the method for producing a nickel metal-hydride storage battery according to the present invention includes the foregoing first through fourth operations. The foregoing second operation allows cobalt or cobalt hydroxide contained in the positive electrodes to be oxidized so as to become cobalt oxyhydroxide, thereby forming an electric network among positive electrode active materials, charging the negative electrodes, and forming a discharge reserve in the negative electrodes. The discharge reserve is equivalent to a dischargeable capacity portion formed at the negative electrode. The discharge reserve prevents polarity inversion upon overdischarging. Furthermore, the third operation efficiently activates an initial active material in the positive electrodes that has not been activated sufficiently. Furthermore, the fourth operation activates an active material in the negative electrodes within a relatively short period of time.

The foregoing method according to the present invention for producing a nickel metal-hydride storage battery thus ensures activation of a hydrogen-absorbing alloy without aging, thereby making it possible to produce a nickel metal-hydride storage battery at high productivity and low cost.

EXAMPLE

Hereinafter, the present invention will be described in more detail by way of illustrative examples.

First of all, a nickel metal-hydride storage battery produced in the present example is described. In Example 1, a module battery 10 was produced by linking a plurality of unit cells (nickel metal-hydride storage battery).

Figure 2:
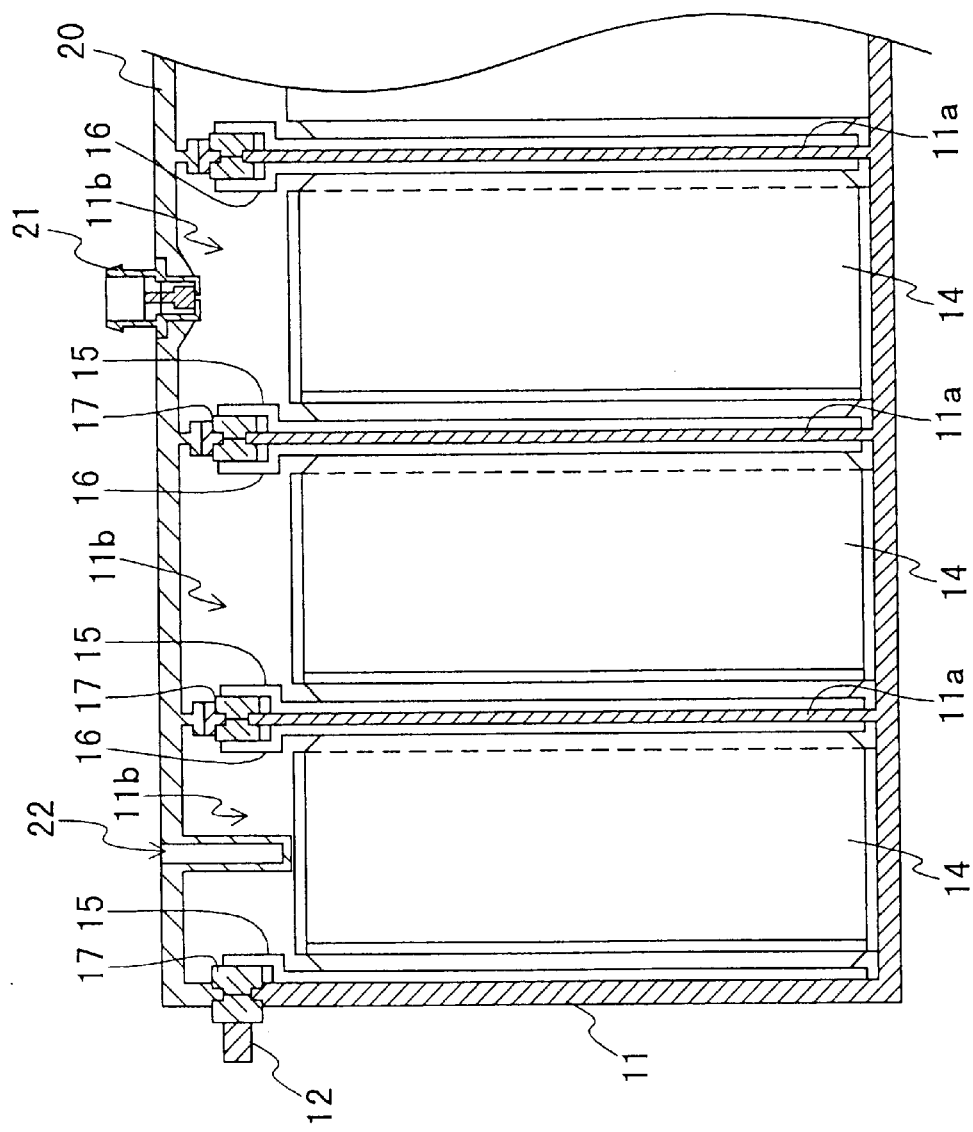
FIG. 2 is a cross-sectional view in the vertical direction of the nickel metal-hydride storage battery shown in FIGS. 1A and 1B.

A top view and a side view schematically illustrating the module battery 10 are shown in FIGS. 1A and 1B, respectively. A view schematically illustrating a cross section of the module battery 10 in the vertical direction is shown in FIG. 2.

As seen in FIGS. 1A and 1B, the module battery 10 has a case 30 including a unitary battery case 11 and a lid 20. On side surfaces of the unitary battery case 11, a positive electrode terminal 12 and a negative electrode terminal 13 are formed. The lid 20 is provided with a safety valve 21 and sensor-insertion holes 22 that allow a sensor for detecting a temperature inside to be inserted therein. It should be noted that the unitary battery case 11 and the lid 20 have projections and depressions on their surfaces for enhancing the heat dissipation when being used, but they are not shown in FIGS. 1A, 1B, and 2.

The unitary battery case 11 is made of a polymer alloy of polypropylene and polyphenylene ether, and is provided with partition walls 11a that are formed inside. In other words, the unitary battery case 11 is divided into a plurality of battery cases 11b by the partition walls 11a. In each battery case 11b, a set of electrode plates 14 and an electrolyte (not shown) are sealed.

The partition wall 11a has an opening on an upper side. A charge collector 15 of the electrode plate set 14 (hatching omitted) disposed in each battery case 11a, and a charge collector 16 of an adjacent electrode plate set 14 (hatching omitted) are connected electrically with each other via a metal connector 17 placed at the opening. Metal connectors 17 positioned at both ends are connected to the positive electrode terminal 12 and the negative electrode terminal 13.

The safety valve 21 is used for releasing gas inside the unitary battery case 11 when an internal pressure of the unitary battery case 11 exceeds a threshold value, so that the internal pressure lowers to a threshold value. It should be noted that through-holes (not shown) for connecting adjacent battery cases 11b are provided in the lid 20, and the internal pressures of the battery cases 11b substantially are equal to each other.

Figure 3:
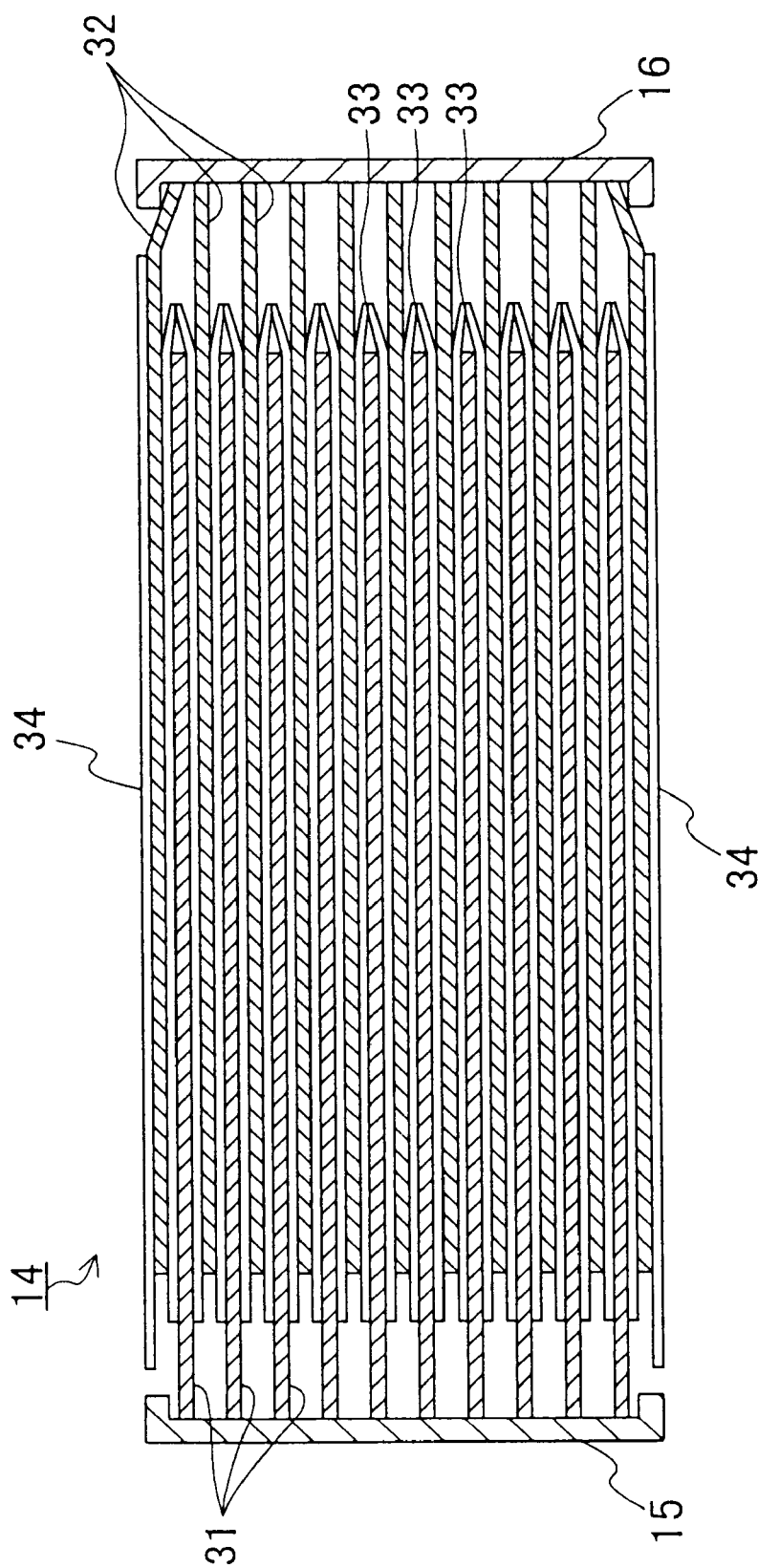
FIG. 3 is a cross-sectional view in the horizontal direction of a set of electrode plates of the nickel metal-hydride storage battery shown in FIGS. 1A and 1B.

FIG. 3 schematically illustrates a cross section of the electrode plate set 14 in the horizontal direction. As seen in FIG. 3, the electrode plate set 14 includes positive electrodes 31 and negative electrodes 32 that are arranged alternately, sack-like separators 33, and the charge collectors 15 and 16. Each positive electrode 31 may be inserted in its own separator 33 (hatching omitted).

The positive electrodes 31 are welded to the charge collector 15, while the negative electrodes 32 are welded to the charge collector 16. Furthermore, a circumference separator 34 (hatching omitted) is provided on a side of the electrode plate set 14.

Thus, the module battery 10 is composed of six unit cells connected in series, each of which is provided with the electrode plate set 14.

The following description will depict a method for producing the module battery 10.

The positive electrode 31 was made by filling nickel foam with an active material paste for the positive electrode, then, drying, pressing, and cutting the same. The active material paste contained nickel hydroxide, cobalt metal, and cobalt hydroxide. The negative electrode 32 was made by applying a paste containing a hydrogen-absorbing alloy over a perforated metal made of nickel, then drying, pressing, and cutting the same. As the hydrogen-absorbing alloy, an $AB_5$-based hydrogen-absorbing alloy (composition: $MmNi_{3.55}Mn_{0.4}Al_{0.3}Co_{0.75}$) was used. As the separators 33, a non-woven fabric made of sulfonated polypropylene was used. As the electrolyte, an electrolyte containing potassium hydroxide as a principal solute was used.

Each positive electrode 31 was inserted into a sack-like separator 33, and the positive electrodes 31 and the negative electrodes 32 were laminated alternately. Then, the positive electrodes 31 were welded to the charge collector 15, while the negative electrodes 32 were welded to the charge collector 16, so that the electrode plate set 14 was formed. The electrode plate set 14 was inserted in each battery case 11$b$, and adjacent electrode plate sets 14 were connected in series with each other via the metal connectors 17. Thereafter, the electrolyte was poured therein, and the unitary battery case 11 was sealed with the lid 20. Thus, a module battery 10 with a nominal capacity of 6.5 Ah was assembled.

The module battery 10 was charged for two hours with electric current of approximately 0.08 C (1C=6.5 ampere). This charging caused Co and $Co(OH)_2$ contained in the positive electrodes 31 to be oxidized into CoOOH, and at the same time caused the negative electrodes to be reduced, thereby causing a discharge reserve to be formed.

Subsequently, initial charging/discharging was carried out. More specifically, first of all, the charging was carried out with electric current of approximately 0.5 C until the SOC rose to approximately 110%, and thereafter, the discharging was carried out with electric current of approximately 0.5 C until the SOC lowered to approximately 0%. In this initial charging/discharging, nickel hydroxide was oxidized into nickel oxyhydroxide, and thereafter, it was reduced to nickel hydroxide again, so that the activity was enhanced.

Figure 4:
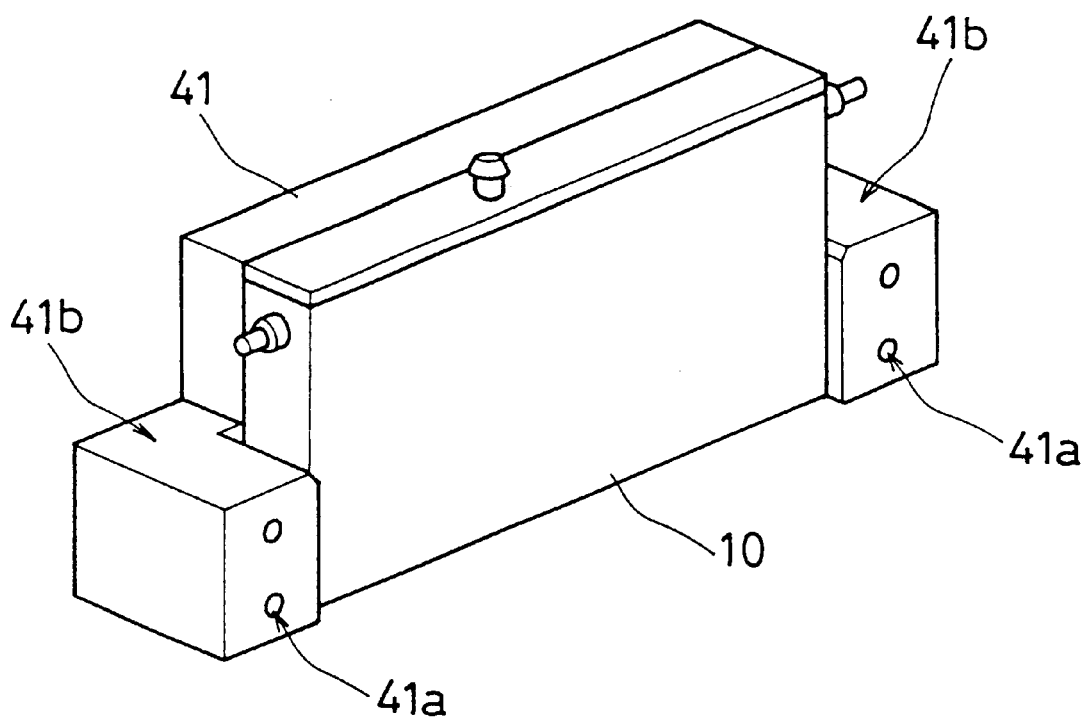
FIG. 4 is a perspective view illustrating an example of an operation in the method according to the present invention.

Thereafter, as shown in FIG. 4, the module battery 10 having been subjected to the initial charging/discharging was fitted in a cooling frame 41 made of aluminum. The cooling frame 41 was in an angular U shape, and had through-holes 41$a$ in side parts thereof. Upper surfaces 41$b$ of the side parts of the cooling frame 41 were formed at positions such that they were out of contact with the positive electrode terminal 12 and the negative electrode terminal 13. Since the cooling frame 41 was in the angular U shape, it was easy to attach and detach the module battery 10 thereto and therefrom. It should be noted that the cooling frame 10 preferably has projections and depressions that are fitted with the projections and depressions on the surfaces of the module battery 10, on surfaces in contact with the module battery 10.

Figure 5:
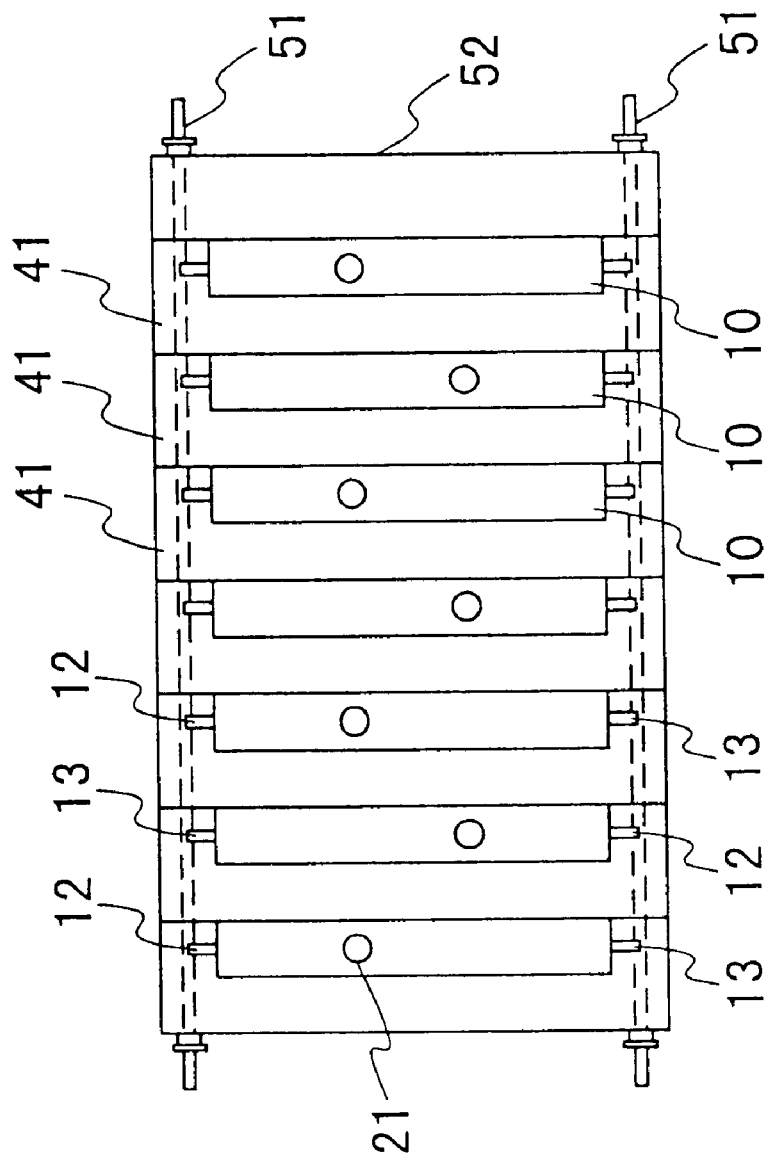
FIG. 5 is a plan view illustrating an example of an operation in the method according to the present invention.

Thereafter, as shown in FIG. 5, a plurality of the cooling frames 41, in each of which the module battery 10 was attached, were linked. Here, they were easily fixed by passing bolts 51 through the through-holes 41$a$ provided in the side parts of the cooling frames 41. Furthermore, an end plate 52 was provided at an end of the linked cooling frames 41. It should be noted that the module battery 10 slightly expands upon charging/discharging for activation. Therefore, the size of each of the cooling frames 41 was determined considering the expansion.

Thereafter, the cooling frames 41 thus linked were placed in a water tank, and the cooling frames 41 and the module batteries 10 were cooled with running water (coolant) at 37° C. Here, the running water was controlled so as to have a height such that it was out of contact with the positive electrode terminal 12 and the negative electrode terminal 13 and that it covered the upper surfaces 41$b$ of the side parts of the cooling frames 41. The running rate of the water was set to 30 L/min (30000 $cm^3$/min).

While the water ran, a charging/discharging cycle, in which the charging was carried out with electric current of approximately 4 C until the SOC rose to 90% and the discharging was carried out with electric current of approximately 4 C until the SOC lowered to 0%, was repeated 20 times. Here, the internal temperature of the module batteries 10 rose to 50° C., which was measured by sensors inserted in the sensor insertion holes 22.

Thus, the activation of the module batteries 10 was completed. The total period of time required for the activation by the foregoing method was twelve hours. On the other hand, as a comparative example, batteries were produced as follows by a different method of activation. First of all, a module battery 10 having the same configuration as that in the foregoing example and having a nominal capacity of 6.5 Ah was assembled, and was charged with electric current of approximately 0.08 C for two hours. Subsequently, like in the foregoing example, the charging was carried out with electric current of approximately 0.5 C until the SOC rose to 110%, then, the discharging was carried out with electric current of approximately 0.5 C until the SOC lowered to approximately 0%. Thereafter, the module battery was aged at 45° C. for three days, whereby the activation of the module battery was ended. By the activation method of this comparative example, an output at the same level as that of the battery of the aforementioned example was obtained, but the activation took 74 hours.

Thus, by using the producing method of the present invention, it was possible to produce a nickel metal-hydride storage battery at high productivity and low cost.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing a nickel metal-hydride storage battery that includes positive electrodes containing nickel hydroxide and negative electrodes containing a hydrogen-absorbing alloy, and has a nominal capacity of C (ampere-hour), the method comprising:

(i) assembling a battery by enclosing the positive electrodes, the negative electrodes, separators, and an electrolyte in a case;

(ii) charging the battery with electric current in a range of 0.05 C (ampere) to 0.2 C (ampere) until a state of charge rises to a range of 10% to 30%;

(iii) overcharging the battery having been subjected to the charging with electric current in a range of 0.2 C (ampere) to 1 C (ampere), and thereafter discharging the same until the state of charge lowers to 10% or below; and (iv) subjecting the battery after the discharging to a plurality of charging-discharging cycles, each charging-discharging cycle being composed of charging the battery with electric current in a range of 0.2 C (ampere) to 5 C (ampere) until the state of charge rises to a range of 60% to 95%, and discharging the same until a battery voltage lowers to a range of 0.70 V to 1.05 V, wherein in the charging-discharging cycles, the battery is cooled with a coolant at a temperature in a range of 30° C. to 60° C.

2. The method according to claim 1, wherein the charging-discharging cycle is carried out 5 times to 60 times.

3. The method according to claim 1, wherein in the charging-discharging cycles, the battery is cooled with a coolant at a temperature in a range of 30° C. to 45° C.

4. The method according to claim 1, wherein the coolant is water.

5. The method according to claim 1, wherein in the charging-discharging cycles, the battery is cooled using a cooling frame.

* * * * *